(12) United States Patent
Davydov et al.

(10) Patent No.: US 8,977,307 B2
(45) Date of Patent: Mar. 10, 2015

(54) BEAMFORMING COORDINATION IN HETEROGENEOUS NETWORKS

(75) Inventors: Alexei Davydov, Nizhny Novgorod (RU); Gregory V. Morozov, Nizhny Novgorod (RU); Alexander Maltsev, Nizhny Novgorod (RU); Andrey Pudeyev, Nizhny Novgorod (RU)

(73) Assignee: Intel Corporation, Santa Clara, CA (US)

( * ) Notice: Subject to any disclaimer, the term of this patent is extended or adjusted under 35 U.S.C. 154(b) by 274 days.

(21) Appl. No.: 13/538,784

(22) Filed: Jun. 29, 2012

(65) Prior Publication Data

US 2013/0115985 A1    May 9, 2013

Related U.S. Application Data (60) Provisional application No. 61/556,109, filed on Nov. 4, 2011.

(51) Int. Cl.
*H04B 15/00* (2006.01)
*H04B 7/04* (2006.01)

(52) U.S. Cl.
CPC ............ *H04B 7/0417* (2013.01); *H04B 7/0456* (2013.01)
USPC .............. 455/501; 455/452.2; 455/7; 455/69; 455/67.13; 375/260

(58) Field of Classification Search
CPC .... H04B 1/1036; H04B 15/00; H04B 7/0632; H04B 7/0636; H04B 7/0639; H04B 7/0663; H04B 7/0673; H04B 17/006; H04B 17/0062; H04B 17/0067; H04B 2001/1027; H04W 16/14

USPC .......... 455/501, 63.1, 67.13, 67.15, 522, 524, 455/69, 452.2, 88; 370/329, 331; 375/260, 375/148, 316, 267, 295, 224; 342/373
See application file for complete search history.

(56) References Cited

U.S. PATENT DOCUMENTS

| | | | | |
|---|---|---|---|---|
| 8,559,294 | B2 * | 10/2013 | Vook et al. | 370/203 |
| 2008/0146154 | A1 * | 6/2008 | Claussen et al. | 455/63.1 |
| 2009/0245195 | A1 * | 10/2009 | Bhattad et al. | 370/329 |
| 2009/0245331 | A1 * | 10/2009 | Palanki et al. | 375/148 |
| 2010/0091893 | A1 * | 4/2010 | Gorokhov | 375/260 |
| 2010/0202553 | A1 * | 8/2010 | Kotecha et al. | 375/267 |

(Continued)

FOREIGN PATENT DOCUMENTS

WO    2013/067009 A2    5/2013

OTHER PUBLICATIONS

International Search Report and Written Opinion Received for PCT Application No. PCT/US2012/062796, mailed on Apr. 30, 2013, 11 Pages.

*Primary Examiner* — Tan Trinh
(74) *Attorney, Agent, or Firm* — Thorpe North & Western LLP (57) ABSTRACT

Technology for spatial domain beamforming coordination at a low power node (LPN) in a heterogeneous network (HetNet) is disclosed. One method can include the LPN collecting spatial feedback information of macro node interference from a plurality of wireless devices in a LPN cell. The LPN can compile the spatial feedback information into a spatial feedback report. The LPN can send the spatial feedback report from the LPN to a macro node for calculating a beamforming vector to reduce the macro node interference for the plurality of wireless devices in the LPN cell.

27 Claims, 7 Drawing Sheets

(56) References Cited

U.S. PATENT DOCUMENTS

| | | | |
|---|---|---|---|
| 2011/0009076 A1* | 1/2011 | Li et al. | 455/88 |
| 2011/0115675 A1* | 5/2011 | Sanayei | 342/373 |
| 2011/0149894 A1* | 6/2011 | Luo et al. | 370/329 |
| 2011/0170496 A1* | 7/2011 | Fong et al. | 370/329 |
| 2011/0217985 A1* | 9/2011 | Gorokhov | 455/452.2 |
| 2012/0238302 A1* | 9/2012 | Pedersen et al. | 455/501 |
| 2013/0017855 A1* | 1/2013 | Hui et al. | 455/522 |
| 2013/0114658 A1* | 5/2013 | Davydov et al. | 375/224 |
| 2013/0250913 A1* | 9/2013 | Geirhofer et al. | 370/331 |

* cited by examiner

BEAMFORMING COORDINATION IN HETEROGENEOUS NETWORKS

RELATED APPLICATIONS

This application claims the benefit of and hereby incorporates by reference U.S. Provisional Patent Application Ser. No. 61/556,109, filed Nov. 4, 2011.

BACKGROUND

Wireless mobile communication technology uses various standards and protocols to transmit data between a transmission station and a wireless device. Some wireless devices communicate in downlink transmission using orthogonal frequency-division multiplexing (OFDM) and communicate in an uplink transmission using single-carrier frequency-division multiple access (SC-FDMA) combined with a desired digital modulation scheme via a physical layer. Standards and protocols that use OFDM include the third generation partnership project (3GPP) long term evolution (LTE), the Institute of Electrical and Electronics Engineers (IEEE) 802.16 standard (e.g., 802.16e, 802.16m), which is commonly known to industry groups as WiMAX (Worldwide interoperability for Microwave Access), and the IEEE 802.11 standard, which is commonly known to industry groups as WiFi.

In 3GPP radio access network (RAN) LTE systems, the node (e.g., a transmission station) can be a combination of Evolved Universal Terrestrial Radio Access Network (E-UTRAN) Node Bs (also commonly denoted as evolved Node Bs, enhanced Node Bs, eNodeBs, or eNBs) and Radio Network Controllers (RNCs), which communicate with a wireless device (e.g., mobile device), known as a user equipment (UE). A downlink (DL) transmission can be a communication from the node (or eNodeB) to the wireless device (or UE), and an uplink (UL) transmission can be a communication from the wireless device to the node.

In homogeneous networks, the node, also called a macro node, can provide basic wireless coverage to wireless devices in a cell. The cell can be the area in which the wireless devices are operable to communicate with the macro node. Heterogeneous networks (HetNets) are used to handle the increased traffic loads on the macro nodes due to increased usage and functionality of wireless devices. HetNets can include a layer of planned high power macro nodes (or macro-eNBs) overlaid with layers of lower power nodes (micro-eNBs, pico-eNBs, femto-eNBs, or home eNBs [HeNBs]) that can be deployed in a less well planned or even entirely uncoordinated manner within the coverage area (cell) of a macro node. The lower power nodes can generally be referred to as "low power nodes". The macro node can be used for basic coverage, and the low power nodes can be used to fill coverage holes, to improve capacity in hot-zones or at the boundaries between the macro nodes' coverage areas, and improve indoor coverage where building structures impede signal transmission. HetNets can be used to optimize performance particularly for unequal user or traffic distribution and improve spectral efficiency (SE) per unit area of a cell. HetNets can also achieve significantly improved overall capacity and cell-edge performance.

Inter-cell interference coordination (ICIC) or enhanced ICIC (eICIC) may be used for resource coordination to reduce interference between the nodes, such as macro nodes and low power nodes. In ICIC, an interfering node (referred to as an aggressor node) may give up use of some resources in order to enable control and data transmissions between a low power node (referred to as a victim node) and a wireless device affected by interference from the aggressor node (referred to as a victim device). The nodes, such as the macro nodes and/or lower power nodes (LPN), can also be grouped together with other transmission stations in a Coordinated MultiPoint (COMP) system where transmission stations from multiple cells can transmit signals to the wireless device and receive signals from the wireless device.

BRIEF DESCRIPTION OF THE DRAWINGS

Features and advantages of the disclosure will be apparent from the detailed description which follows, taken in conjunction with the accompanying drawings, which together illustrate, by way of example, features of the disclosure; and, wherein.

Reference will now be made to the exemplary embodiments illustrated, and specific language will be used herein to describe the same. It will nevertheless be understood that no limitation of the scope of the invention is thereby intended.

DETAILED DESCRIPTION

Before the present invention is disclosed and described, it is to be understood that this invention is not limited to the particular structures, process steps, or materials disclosed herein, but is extended to equivalents thereof as would be recognized by those ordinarily skilled in the relevant arts. It should also be understood that terminology employed herein is used for the purpose of describing particular examples only and is not intended to be limiting. The same reference numerals in different drawings represent the same element. Numbers provided in flow charts and processes are provided for clarity in illustrating steps and operations and do not necessarily indicate a particular order or sequence.

Example Embodiments

An initial overview of technology embodiments is provided below and then specific technology embodiments are described in further detail later. This initial summary is intended to aid readers in understanding the technology more quickly but is not intended to identify key features or essential features of the technology nor is it intended to limit the scope of the claimed subject matter.

In heterogeneous networks (HetNets), interference mitigation can include coordinated time-domain resource blanking of macro node in a macro cell and LPNs in LPN cells (e.g., pico-cells). Interference mitigation by resource blanking can increase system overhead due to unused resources in the network. Coordinated beamforming (CB) and scheduling can provide another interference mitigation technique. Coordinated beamforming (CB) and scheduling can provide multi-point beamforming with coordination (e.g., Coordinated MultiPoint (COMP) or multi-base station multiple-input, multiple-output (multi-BS MIMO) systems) with distributed scheduling using a low capacity high latency backhaul link. The coordinated multi-point transmission with distributed scheduling used for the coordinated beamforming (CB) and scheduling can also define processes for resource partition and feedback schemes to assist the beamforming coordination.

Figure 1:
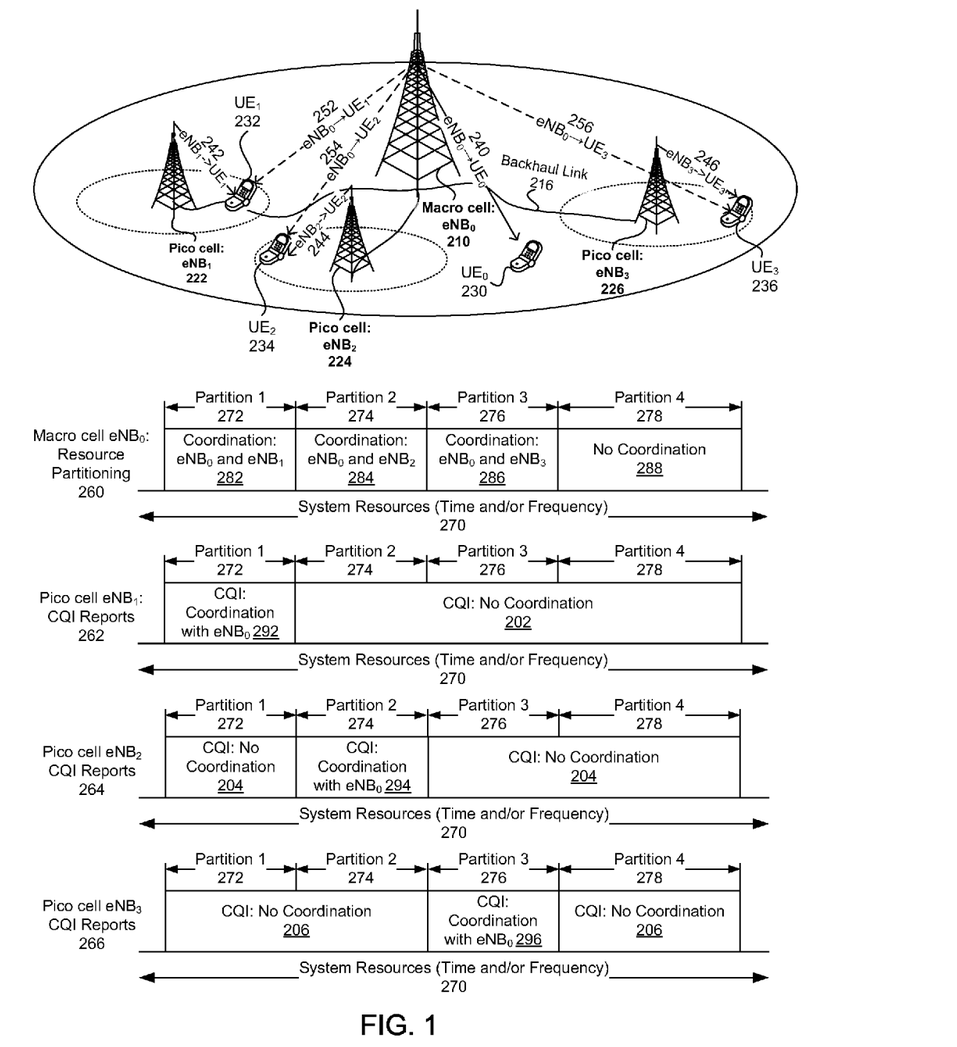
FIG. 1 illustrates a diagram of non-coordinated time-frequency resource partitions and coordinated time-frequency resource partitions for a heterogeneous network (HetNet) with a macro node, low power nodes (LPNs), and wireless devices in accordance with an example.

FIG. 1 illustrates an example heterogeneous network with low power nodes (e.g., $eNB_1$ 222, $eNB_2$ 224, and $eNB_3$ 226) within LPN cells (e.g., pico-cells) placed within a coverage area a macro node (e.g., $eNB_0$ 210) in a macro cell. The macro node $eNB_0$ can be connected to each subordinate LPN via backhaul link 216 using X2 interface for X2 signaling or backhaul link signaling, and the macro node $eNB_0$ may exchange some feedback information for coordination with the LPNs (e.g., $eNB_1$, $eNB_2$, and $eNB_3$). Distributed scheduling can provide effective coordination for joint macro and pico cell operation when a low capacity high latency backhaul link is used. Due to potential bandwidth and latency constraints of the backhaul link, the distributed scheduling may be used for joint macro and pico cell operation over other downlink CoMP transmission schemes.

The interference characteristics of HetNets can be significantly different from interference characteristics of homogenous networks. For example, due to the transmission power of the macro node, the interference from super-ordinate macro cell $eNB_0$ 210 can dominate the wireless devices (e.g., $UE_1$ 232, $UE_2$ 234, and $UE_3$ 236) of a LPN cell over interference from other LPNs (e.g., $eNB_1$ 222, $eNB_2$ 224, and $eNB_3$ 226) or wireless devices (e.g., $UE_1$, $UE_2$, $UE_3$, and $UE_0$ 230). Interference handling from macro cell to sub-ordinate LPN cells can be used for efficient HetNet operation. The HetNet can have high spatial correlation of interference from macro cell on the wireless devices within the LPN cell coverage area due to the relatively small size of LPN cells to a macro cell size and LPNs' location near to a macro cell edge.

Based on spatial characteristics of the LPN cell, time-frequency resources (e.g., subframes) or system resources 270 can be partitioned to improve interference mitigation. In an example, the macro cell $eNB_0$ 210 can logically subdivide available time-frequency resources into resource partitions (e.g. subframes), which resources may be physically adjacent or distributed in a frequency domain. Although the resource partitions is described in relation to a subframe, any type of resource component, such as a radio frame, a radio subframe, a slot, a frequency carrier, a frequency subcarrier, a physical resource block (PRB), or a subband may used for the resource partitions. The macro cell $eNB_0$ resource partition 260 of FIG. 1 illustrates four logical time-frequency resource partitions. The first three partitions (Partition 1 272, Partition 2 274, and Partition 3 276) can correspond to the set of time-frequency resources allocated for the beamforming and scheduling coordination of the macro cell $eNB_0$ with the LPN cells. Partition 1 can be allocated for coordination between the $eNB_0$ and the $eNB_1$ 282, Partition 2 can be scheduled for coordination between the $eNB_0$ and the $eNB_2$ 284, and Partition 3 can be scheduled for coordination between the $eNB_0$ and the $eNB_3$ 286. The fourth time-frequency partition (Partition 4 278) can be used for macro cell $eNB_0$ transmissions without coordination (e.g., no coordination 288) with LPN transmissions. The resource partitions can depend on the number of deployed LPN cell, the macro cell and LPN cell traffic loads, and LPN cell positions. The resource partitions can be semi-statically configured via higher layer signaling, such as radio resource control (RRC) signaling. The parameters of a resource partitioning can be signaled by the macro cell $eNB_0$ to the subordinate LPNs via a backhaul link using an X2 interface. Each LPN can then provide the resource partitioning information to the served wireless device about a size and a position of a partition designated to the LPN cell for beamforming coordination mode with the macro cell $eNB_0$. In another example, the resource partitions can be dynamically configured.

The partitions can generally be categorized as coordinated time-frequency resource partitions (e.g., Partition 1 272, Partition 2 274, and Partition 3 276) and non-coordinated time-frequency resource partitions (e.g., Partition 4 278). For example, a beamforming coordination (BC) mode between the macro cell $eNB_0$ 210 and LPN cell $eNB_1$ 222 can operate in Partition 1. To enable beamforming coordination on the allocated resources (e.g., Partition 1) the wireless devices (e.g., $UE_1$ 232) served by the LPN cell $eNB_1$ can provide the spatial feedback information about the interference from macro cell $eNB_0$. The spatial information may consist from a quantized principle eigen-vector (e.g., $v^{(eNB_0 \rightarrow UE_1)}$), which can be reported in the form of precoding matrix indicator (PMI) of the codebook, and/or a signal path gain, which can be reported in the form of a reference signal received power (RSRP), and/or a signal to interference and noise ratio (SINR). Due to distributed scheduling operation at the LPN cell, the spatial feedback information about interference channels can represent a majority of the wireless devices connected to the LPN and can be applicable for an entire coordinated resource partition (e.g., Partition 1). For example, the LPN cell $eNB_1$ can collect the spatial feedback information (including the macro cell $eNB_0$ interference channel) from the connected wireless devices $\{v^{(eNB_0 \rightarrow UE_x)}\}$ over a time-frequency resource (e.g., a time slot), the LPN cell $eNB_1$ can compile the spatial feedback information at the LPN into a spatial feedback report, and the LPN cell $eNB_1$ can report or send the compiled spatial feedback information (e.g., spatial feedback report) to the macro cell $eNB_0$ in some statistical form or reduced message.

For example, in one embodiment, the spatial feedback report by the LPN cell $eNB_1$ 222 to macro cell $eNB_0$ 210 may include one or a set of the most frequently reported PMI indexes along with each reported PMI index's report probability. In another embodiment, the LPNs can report a quantized principle eigen-vector corresponding to matrix $$G = \frac{1}{N_{UE}} \sum_{i=1}^{N_{UE}} SINR_i \cdot \left( v^{(eNB_0 \rightarrow UE_i)} \cdot v^{(eNB_0 \rightarrow UE_i)H} \right),$$

where $SINR_i$ is a signal to noise ratio on $UE_i$ (e.g., wireless device) corresponding to a macro cell link (e.g., without "interference" from the serving LPN cell $eNB_1$) and $N_{UE}$ is a number of UEs reporting spatial feedback information. In another embodiment, the whole matrix G can be reported in the spatial feedback report. A macro cell link 252 from the macro cell $eNB_0$ to the $UE_1$ 232 can act as interference on a serving LPN cell link 242 from the LPN cell $eNB_1$ to the $UE_1$ without coordination. Similarly, a macro cell link 254 from the macro cell eNB$_0$ to the UE$_2$ 234 can act as interference on a serving LPN cell link 244 from the LPN cell eNB$_2$ 224 to the UE$_2$ without coordination, and a macro cell link 256 from the macro cell eNB$_0$ to the UE$_3$ 236 can act as interference on a serving LPN cell link 246 from the LPN cell eNB$_3$ 226 to the UE$_3$ without coordination. A macro cell link 240 from the macro cell eNB$_0$ to the UE$_0$ 230 can include the serving cell link for the UE$_0$.

Due to a relative small size of LPN cells to the size of the macro cell and LPN cells' location near to macro cell edge, interfering eNB$_0$ 210 signals can be highly spatially correlated among the wireless device (e.g., UEs) served by one LPN cell or set of LPN cells in a same geographical direction as a LPN cell. Due to a spatial correlation property of wireless device within the LPN cell, the interference mitigation can be performed effectively for the wireless devices inside of one LPN cell.

For example, the macro cell eNB$_0$ 210 during scheduling of the wireless devices (e.g., UE$_1$ 232) in Partition 1 272 can use the spatial feedback information and/or the spatial feedback report obtained from the LPN cell eNB$_1$ 222 for beamforming calculation. The macro cell eNB$_0$ can suppress interference in the spatial direction corresponding to the most frequently reported PMI, a calculated dominant principle eigen-vector, a matrix G, or other spatial feedback report. The macro cell eNB$_0$ can suppress interference by using zero-forcing procedure or other processes for interference cancellation. The beamforming of the macro node can direct the beamforming transmissions away from the LPN cells using coordination in the specified partition.

The inference level of LPN cell wireless devices for each time-frequency partitions can be significantly different (e.g., UE$_1$ 232 versus UE$_2$ 234) due to different beamforming applied at the macro cell eNB$_0$ for each resource partition. In an example, for the time-frequency Partition 1 272, the interference level of the LPN cell wireless devices (e.g., UE$_1$) with coordination in Partition 1 can be substantially smaller (due to interference mitigation from the macro cell eNB$_0$) than interference on other LPN cell wireless devices (e.g., UE$_2$ 234 and UE$_3$ 236) in other partitions. Also, for the time-frequency Partition 1, the interference level of the LPN cell wireless devices (e.g., UE$_1$) with coordination in Partition 1 can be substantially smaller (due to interference mitigation from the macro cell eNB$_0$) than interference on the same LPN cell wireless devices (e.g., UE$_1$) without coordination in other partitions (e.g., Partitions 2-4). In an example, Partition 1 can provide interference mitigation and coordination with the macro cell eNB$_0$ 292 for wireless devices (e.g., UE$_1$) served by LPN cell eNB$_1$ 222; Partition 2 can provide interference mitigation and coordination with the macro cell eNB$_0$ 294 for wireless devices (e.g., UE$_2$) served by LPN cell eNB$_2$ 224; and Partition 3 can provide interference mitigation and coordination with the macro cell eNB$_0$ 296 for wireless devices (e.g., UE$_3$) served by LPN cell eNB$_3$ 226.

The channel quality indicator (CQI) for a wireless device can differ between a coordinated time-frequency resource partition with suppressed interference from the macro cell eNB$_0$ 292 and a non-coordinated time-frequency resource partition including interference from the macro cell eNB$_0$. To account for differences in the CQI calculation between coordinated time-frequency resource partition and non-coordinated time-frequency resource partition, the interference can be separately measured by a wireless device (e.g., UE$_1$ 232) on the partitions with coordination (e.g., Partition 1) and without coordination (e.g., Partition 2-4). Higher layer signaling (e.g. RRC signaling) can be used to indicate to the wireless device the different resource partitions on which separate interference measurements and CQI reports are provided. The upper layer signaling can include radio resource control (RRC). For example, higher layer signaling can indicate that a wireless device UE$_1$ 232 in LPN cell eNB$_1$ 222 provide interference measurements and CQI reports for Partition 1 (e.g., the coordinated time-frequency resource partition) and separate interference measurements and CQI reports for Partition 2-4 (e.g., the non-coordinated time-frequency resource partitions). In another embodiment, the wireless device can measure the interfering channel (e.g., eNB$_0$→UE$_1$ 252) and the macro cell eNB$_0$ can apply beamforming based on feedback from the wireless device. For example, in the frequency Partition 1, the UE$_1$ can assume substantial interference suppression from the macro cell eNB$_0$ and make measurements and calculations without the contribution of the interfering channel. In another embodiment in the frequency Partition 1 the UE$_1$ can assume the macro cell beamforming is substantially orthogonal to the dominant or principle eigen-vector reported by the UE$_1$ or the spatial feedback report of the LPN cell eNB$_1$ 222 serving the UE$_1$. Additional information about a beamforming strategy on resource partitions can be provided by macro cell eNB$_0$ to wireless devices via the LPNs. CQI can be calculated using an estimation of a propagation channel between a LPN and a wireless device and interference. The propagation channel between LPN and the wireless device can be substantially the same for coordinated and uncoordinated partitions (e.g., non-coordinated partitions), but the interference can be different between coordinated and uncoordinated partitions.

FIG. 1 illustrates the coordinated time-frequency resource partition 292 and the non-coordinated time-frequency resource partitions 202 for the wireless devices (e.g., UE$_1$ 232) served by the LPN cell eNB$_1$ 222. The LPN cell eNB$_1$ can report a different CQI report 262 for the coordinated time-frequency resource partition and the non-coordinated time-frequency resource partitions. Similarly, the LPN cell eNB$_2$ 284 can report a different CQI report 264 for the coordinated time-frequency resource partition 294 and the non-coordinated time-frequency resource partitions 204. Likewise, the LPN cell eNB$_3$ 286 can report a different CQI report 266 for the coordinated time-frequency resource partition 296 and the non-coordinated time-frequency resource partitions 206.

LPN cells with similar spatial characteristics can be grouped together into one resource partition for more efficient heterogeneous system operation. LPNs or LPN cells with similar spatial characteristics can include LPNs generating or compiling a substantially same spatial feedback report or LPNs in substantially similar geographical direction from the macro node.

The spatial domain beamforming coordination using the coordinated time-frequency resource partition and the non-coordinated time-frequency resource partitions can provide interference mitigation with efficient use of time-frequency resources. The interference mitigation can be performed for specific time-frequency resources (e.g., partitions) corresponding to wireless devices (e.g., UEs) with similar interference spatial characteristics. The use of coordinated and non-coordinated resource partitions can avoid the drawbacks of blank transmissions in other interference mitigation schemes due to full usage of the available time-frequency resources.

Figure 2:
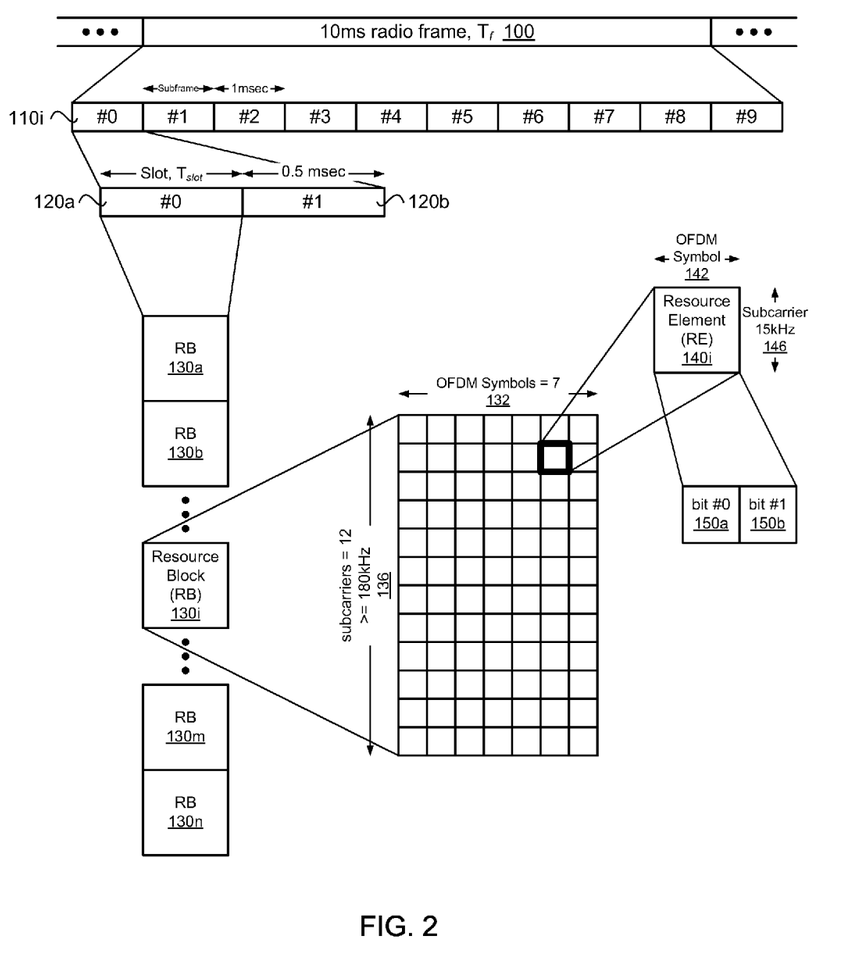
FIG. 2 illustrates a block diagram of radio frame resources in accordance with an example.

In one example, the time-frequency resources or resource components can represent elements of a radio frame structure transmitted on the physical (PHY) layer in a downlink transmission or uplink transmission between a node or a transmission station (or eNodeB) and the wireless device (or UE) using a generic long term evolution (LTE) frame structure, as illustrated in FIG. 2. While an LTE frame structure is illustrated, a frame structure for an IEEE 802.16 standard (WiMax), an IEEE 802.11 standard (WiFi), or another type of communication standard using OFDM may also be used. An uplink transmission may have a similar frame structure to the downlink transmission used in to transmit uplink information from the wireless device to a node.

FIG. 2 illustrates a downlink radio frame structure type 2. In the example, a radio frame 100 of a signal used to transmit the data can be configured to have a duration, $T_f$, of 10 milliseconds (ms). Each radio frame can be segmented or divided into ten subframes 110i that are each 1 ms long. Each subframe can be further subdivided into two slots 120a and 120b, each with a duration, $T_{slot}$, of 0.5 ms. Each slot for a component carrier (CC) used by the transmitting station and the receiving station can include multiple resource blocks (RBs) 130a, 130b, 130i, 130m, and 130n based on the CC frequency bandwidth. The CC can have a carrier frequency having a bandwidth and center frequency. Each RB (physical RB or PRB) 130i can include 12-15 kHz subcarriers 136 (on the frequency axis) and 6 or 7 orthogonal frequency-division multiplexing (OFDM) symbols 132 (on the time axis) per subcarrier. The RB can use seven OFDM symbols if a short or normal cyclic prefix is employed. The RB can use six OFDM symbols if an extended cyclic prefix is used. The resource block can be mapped to 84 resource elements (REs) 140i using short or normal cyclic prefixing, or the resource block can be mapped to 72 REs (not shown) using extended cyclic prefixing. The RE can be a unit of one OFDM symbol 142 by one subcarrier (i.e., 15 kHz) 146. Each RE can transmit two bits 150a and 150b of information in the case of quadrature phase-shift keying (QPSK) modulation. Other types of modulation may be used, such as 16 quadrature amplitude modulation (QAM) or 64 QAM to transmit a greater number of bits in each RE, or bi-phase shift keying (BPSK) modulation to transmit a lesser number of bits (a single bit) in each RE. The RB can be configured for a downlink transmission from the eNodeB to the UE, or the RB can be configured for an uplink transmission from the UE to the eNodeB.

The spatial domain beamforming coordination described can provide various benefits including interference mitigation on semi-static time-frequency resources. The spatial feedback information can include interference spatial information from a majority of the wireless devices or an entire set of wireless devices for interference mitigation. The interference measurements and CQI calculations can be made on pre-defined semi-static time-frequency resources.

Table 1 illustrates an example performance analysis of spectral efficiency (SE) and cell edge performance using the described spatial domain beamforming coordination (i.e., coordinated beamforming (CB) and scheduling), where the SE and the cell edge performance is measured in bits per second/Hertz (bps/Hz). A 4×2 antenna configuration was used in evaluation results for a non-CoMP configuration and two CoMP configurations. The CoMP configurations include a uniform UE dropping configuration and a clustered UE dropping configuration. For performance analysis, a full buffer traffic model, a macro node, four LPNs, and 30 UEs per macro area (e.g., macro cell) were used. In the uniform UE dropping configuration, the UEs were evenly distributed throughout the macro area. In the clustered UE dropping configuration, two thirds (66%) of the UEs were clustered around the LPNs and/or served by the LPNs, and one third (33%) of the UEs were evenly distributed through the rest of the macro area. The clustered UE dropping configuration can represent hot spots, where a majority of the UEs are located a tight radius around the LPNs. The described spatial domain beamforming coordination for both the CoMP uniform and clustered UE dropping configurations can offer performance benefits over a baseline non-CoMP configuration.

TABLE 1

|  | Avg. SE, bps/Hz | Cell Edge, bps/Hz |
| --- | --- | --- |
| Non CoMP | 7.47 | 0.034 |
| Proposed CoMP scheme, uniform UE dropping | 7.91 | 0.039 |
| Proposed CoMP scheme, clustered UE dropping | 8.65 | 0.056 |

Due to distributed operation based on a node basis (e.g., eNB basis), the CoMP configuration for spatial domain beamforming coordination can substantially simplify the complexity of a scheduling algorithm relative to a conventional CoMP configuration without spatial domain beamforming coordination, which can provide a centralized scheduling operation across the entire CoMP cluster (e.g., over number of eNBs). Additionally, a significant part of scheduling from eICIC can be reused for spatial domain beamforming coordination CoMP configuration.

Figure 3:
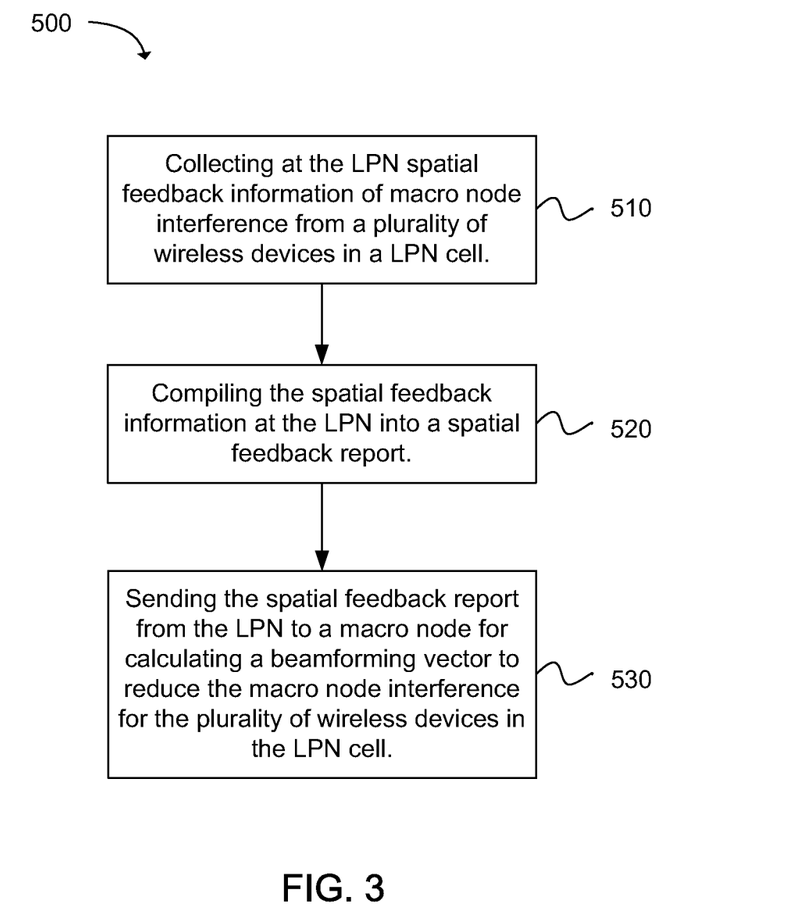
FIG. 3 depicts a flow chart of a method for spatial domain beamforming coordination at a low power node (LPN) in a heterogeneous network (HetNet) in accordance with an example.

Another example provides a method 500 for spatial domain beamforming coordination at a low power node (LPN) in a heterogeneous network (HetNet), as shown in the flow chart in FIG. 3. The method may be executed as instructions on a machine, where the instructions are included on at least one computer readable medium. The method includes the operation of collecting at the LPN spatial feedback information of macro node interference from a plurality of wireless devices in a LPN cell, as in block 510. The operation of compiling the spatial feedback information at the LPN into a spatial feedback report follows, as in block 520. The next operation of the method can be sending the spatial feedback report from the LPN to a macro node for calculating a beamforming vector to reduce the macro node interference for the plurality of wireless devices in the LPN cell, as in block 530.

The spatial feedback information can include a quantized principle eigen-vector, a precoding matrix indicator (PMI) of a codebook, a signal path gain, a reference signal received power (RSRP), a signal to interference and noise ratio (SINR), or combinations of this information. The plurality of wireless devices can include a majority of the wireless devices connected to the LPN.

The operation of compiling the spatial feedback information can further include categorizing the spatial feedback information of the plurality of wireless devices, and selecting a most frequently reported category of PMIs for the spatial feedback report. The spatial feedback information can include a precoding matrix indicator (PMI).

In another example, the operation of compiling the spatial feedback information can further include quantizing a dominant principle eigen-vector corresponding to a matrix $$G = \frac{1}{N_{UE}} \sum_{i=1}^{N_{UE}} SINR_i \cdot \left( v^{(eNB_0 \to UE_i)} \cdot v^{(eNB_0 \to UE_i)H} \right),$$

where $SINR_i$ is a signal to interference and noise ratio (SINR) on a wireless device $UE_i$ corresponding to a macro node link without interference from the LPN, i is a positive integer representing each of the plurality of wireless devices in the LPN cell, and $N_{UE}$ is a positive integer of spatial feedback information reports from the plurality of wireless devices in the LPN cell, $v^{(eNB_0 \to UE_i)}$ is a quantized principle eigen-vector or precoding matrix indicator (PMI) of a codebook representing spatial interference information from the macro node on each wireless device $UE_i$, and $()^H$ is a Hermitian function or conjugate transpose. The LPN can be a serving LPN or a serving $eNB_s$. In an example, the spatial feedback report can include the dominant quantized principle eigen-vector corresponding to the matrix G. In another example, the spatial feedback report can include the quantized matrix G.

The method can further include the low power node (LPN) transmitting a coordinated signal to a wireless device in a coordinated time-frequency resource partition. The coordinated signal can have reduced interference from a macro node transmission in the spatial direction of the wireless device using beamforming during the coordinated time-frequency resource partition. The LPN can receive from the wireless device a coordinated channel quality indicator (CQI) feedback. The coordinated CQI feedback can include an estimation of a propagation channel and interference during the coordinated time-frequency resource partition at the wireless device. The LPN can modulate and code the coordinated signal using a coordinated modulation and coding scheme (MCS) based on the coordinated CQI feedback. The LPN can transmit a non-coordinated signal to the wireless device from LPN in a non-coordinated time-frequency resource partition. The non-coordinated signal can include interference from a macro node transmission during the non-coordinated time-frequency resource partition. The LPN can receive from the wireless device a non-coordinated CQI feedback. The non-coordinated CQI feedback can include an estimation of a propagation channel and interference including a macro node interference channel during non-coordinated time-frequency resource partition at the wireless device. The LPN can modulate and code the non-coordinated signal using a non-coordinated MCS based on the non-coordinated CQI feedback. The coordinated MCS can differ from the non-coordinated MCS.

The method can further include the low power node (LPN) semi-statically configuring coordinated time-frequency resource partitions and non-coordinated time-frequency resource partitions via backhaul link using the X2 interface for X2 signaling or the backhaul link signaling. A coordinated signal can be transmitted to a wireless device having reduced interference from a macro node transmission in the spatial direction of the wireless device using beamforming during the coordinated time-frequency resource partition. A non-coordinated signal to the wireless device can include interference from a macro node transmission during the non-coordinated time-frequency resource partition. The coordinated time-frequency resource partitions and the non-coordinated time-frequency resource partitions can include a radio frame, a radio subframe, a slot, a frequency carrier, a frequency subcarrier, a physical resource block (PRB), a subband, and combinations of these time-frequency resources.

Figure 4:
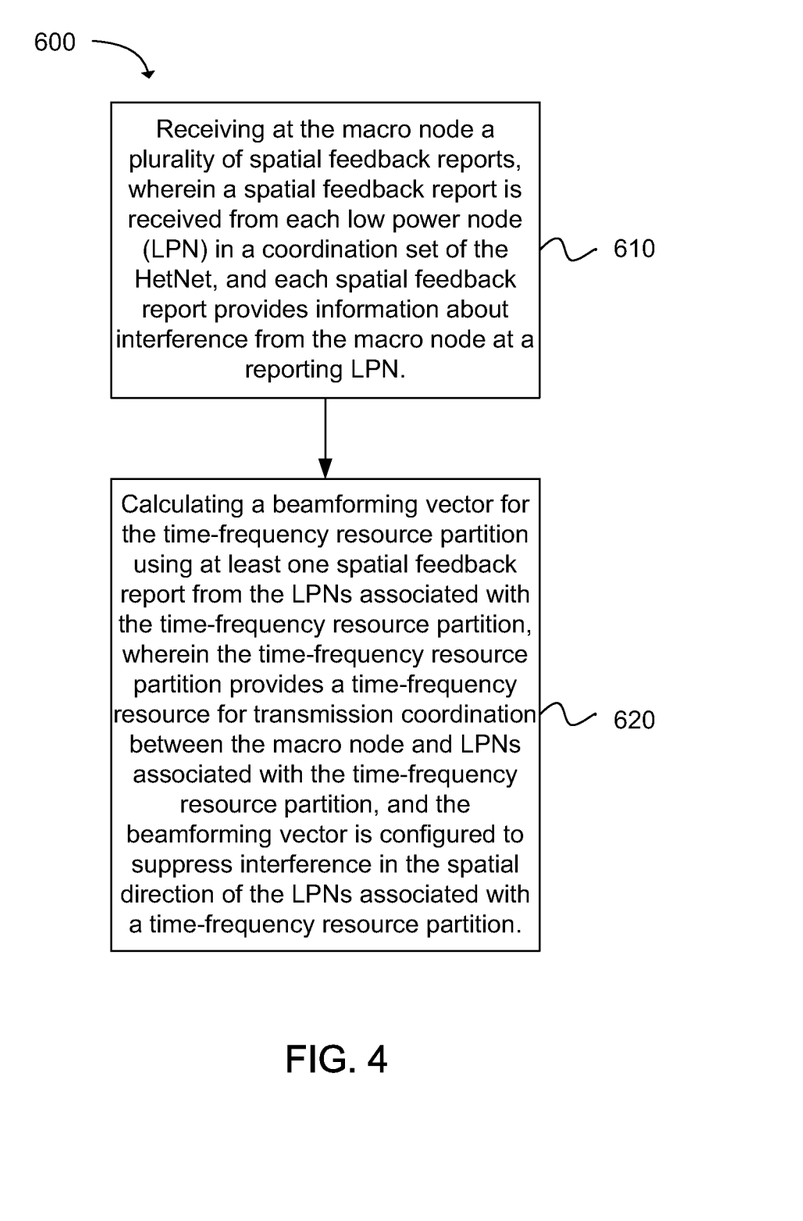
FIG. 4 depicts a flow chart of a method for spatial domain beamforming coordination at a macro node in a heterogeneous network (HetNet) in accordance with an example.

Another example provides a method 600 for spatial domain beamforming coordination at a macro node in a heterogeneous network (HetNet), as shown in the flow chart in FIG. 4. The method includes the operation of receiving at the macro node a plurality of spatial feedback reports, wherein a spatial feedback report is received from each low power node (LPN) in a coordination set of the HetNet, and each spatial feedback report provides information about interference from the macro node at a reporting LPN, as in block 610. The operation of calculating a beamforming vector for the time-frequency resource partition using at least one spatial feedback report from the LPNs associated with the time-frequency resource partition, wherein the time-frequency resource partition provides a time-frequency resource for transmission coordination between the macro node and LPNs associated with the time-frequency resource partition, and the beamforming vector is configured to suppress interference in the spatial direction of the LPNs associated with a time-frequency resource partition follows, as in block 620.

The method can further include the macro node grouping of LPNs with similar spatial characteristics into a same time-frequency resource partition as determined by the spatial feedback reports of the LPNs. In another example, the method can further include the macro node transmitting a channel using the beamforming vector during the time-frequency resource partition. The operation of calculating the beamforming vector can further include using a zero-forcing process for interference mitigation.

The spatial feedback report can include a most frequently reported category of precoding matrix indicator (PMI) of codebook by wireless devices served by a reporting LPN, a quantized dominant principle eigen-vector of the wireless devices served by the reporting LPN, a matrix G generated by the reporting LPN from the wireless devices served by the reporting LPN, and combinations these feedbacks. The quantized dominant principle eigen-vector can correspond to a matrix $$G = \frac{1}{N_{UE}} \sum_{i=1}^{N_{UE}} SINR_i \cdot \left( v^{(eNB_0 \to UE_i)} \cdot v^{(eNB_0 \to UE_i)H} \right),$$

where $SINR_i$ is a signal to interference and noise ratio (SINR) on a wireless device $UE_i$ corresponding to a macro node link without interference from the LPN, i is a positive integer representing each of the plurality of wireless devices in the LPN cell, and $N_{UE}$ is a positive integer of spatial feedback information reports from the plurality of wireless devices in the LPN cell, $v^{(eNB_0 \to UE_i)}$ is a quantized principle eigen-vector for a specified time slot representing the interference from the macro node on each wireless device $UE_i$, and $()^H$ is a Hermitian function or conjugate transpose.

The method can further include the macro node semi-statically configuring coordinated time-frequency resource partitions and non-coordinated time-frequency resource partitions via backhaul link using the X2 interface for X2 signaling or the backhaul link signaling. A coordinated signal can be transmitted to a wireless device in a specified LPN cell having reduced interference from a macro node transmission in the spatial direction of the wireless device using beamforming during the coordinated time-frequency resource partition. A non-coordinated signal to the wireless device in the specified LPN cell can include interference from a macro node transmission during the non-coordinated time-frequency resource partition. The coordinated time-frequency resource partitions and the non-coordinated time-frequency resource partitions can include a radio frame, a radio subframe, a slot, a frequency carrier, a frequency subcarrier, a physical resource block (PRB), a subband, and combinations of these time-frequency resources. The operation of receiving the plurality of spatial feedback reports can further include X2 signaling or backhaul link signaling with the LPNs via a wired connection, a wireless connection, or an optical fiber connection.

Figure 5:
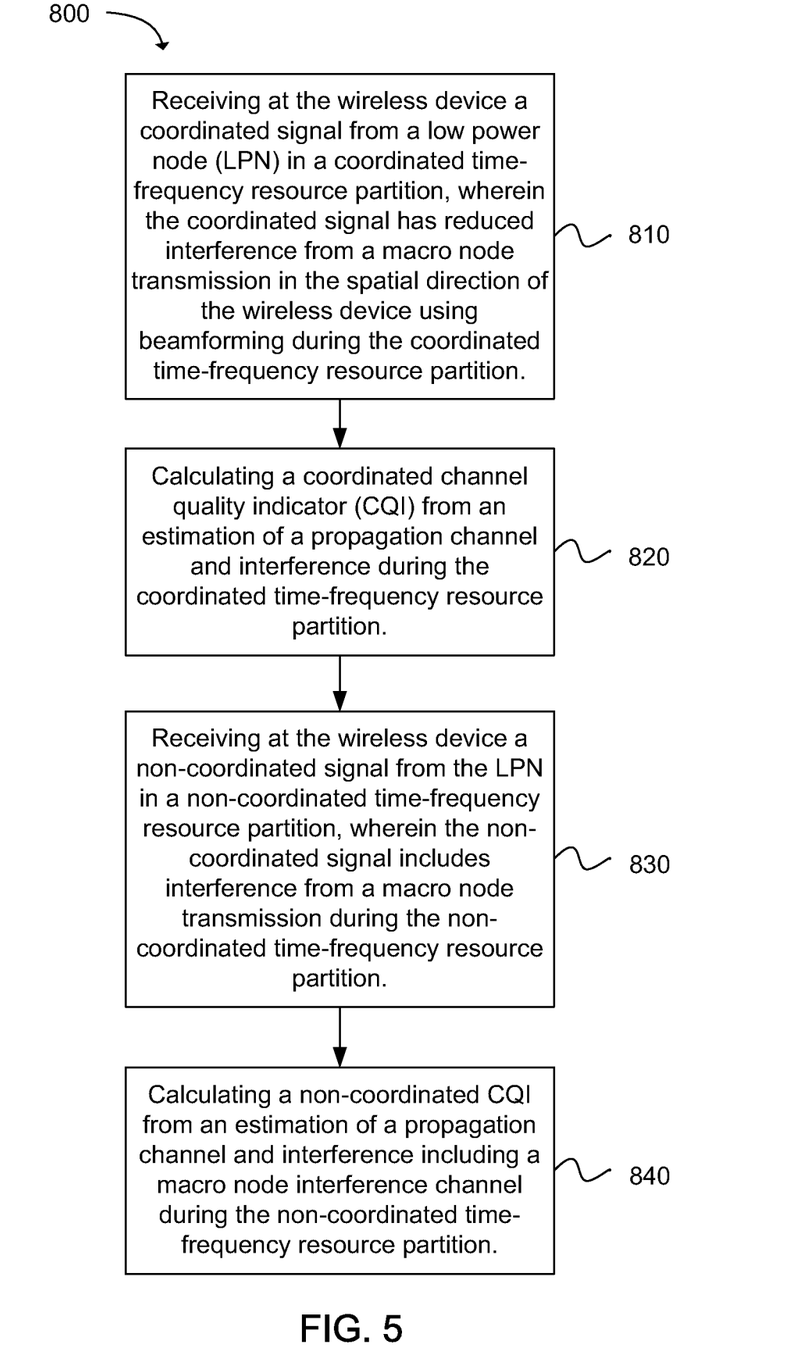
FIG. 5 depicts a flow chart of a method for spatial domain beamforming coordination at a wireless device in a heterogeneous network (HetNet) accordance with an example.

Another example provides a method 800 for spatial domain beamforming coordination at a wireless device in a heterogeneous network (HetNet), as shown in the flow chart in FIG. 5. The method may be executed as instructions on a machine, where the instructions are included on at least one computer readable medium. The method includes the operation of receiving at the wireless device a coordinated signal from a low power node (LPN) in a coordinated time-frequency resource partition, wherein the coordinated signal has reduced interference from a macro node transmission in the spatial direction of the wireless device using beamforming during the coordinated time-frequency resource partition, as in block 810. The operation of calculating a coordinated channel quality indicator (CQI) from an estimation of a propagation channel and interference during the coordinated time-frequency resource partition follows, as in block 820. The next operation of the method can be receiving at the wireless device a non-coordinated signal from the LPN in a non-coordinated time-frequency resource partition, wherein the non-coordinated signal includes interference from a macro node transmission during the non-coordinated time-frequency resource partition, as in block 830. The method further includes calculating a non-coordinated CQI from an estimation of a propagation channel and interference including a macro node interference channel during the non-coordinated time-frequency resource partition, as in block 840.

The method can further include the wireless device transmitting the coordinated CQI to the LPN to enable transmission with coordinated modulation and coding scheme (MCS) for the coordinated signal. The wireless device can transmit the non-coordinated CQI to the LPN to enable transmission with non-coordinated MCS for the non-coordinated signal to be determined the LPN. In another example, the wireless device can transmit spatial feedback information of macro node interference channel from the wireless device to the LPN. The spatial feedback information can include a quantized principle eigen-vector, a preceding matrix indicator (PMI) of a code book, a signal path gain, a reference signal received power (RSRP), a signal to interference and noise ratio (SINR), or combinations of these feedbacks. The coordinated time-frequency resource partitions and the non-coordinated time-frequency resource partitions can include a radio frame, a radio subframe, a slot, a frequency carrier, a frequency subcarrier, a physical resource block (PRB), a subband, and combinations of these time-frequency resources. The wireless device can include a user equipment (UE) or a mobile station (MS). The wireless device can be configured to connect to at least one of a wireless local area network (WLAN), a wireless personal area network (WPAN), and a wireless wide area network (WWAN). The wireless device can include at least one of an antenna, a touch sensitive display screen, a speaker, a microphone, a graphics processor, an application processor, internal memory, or a non-volatile memory port.

Figure 6:
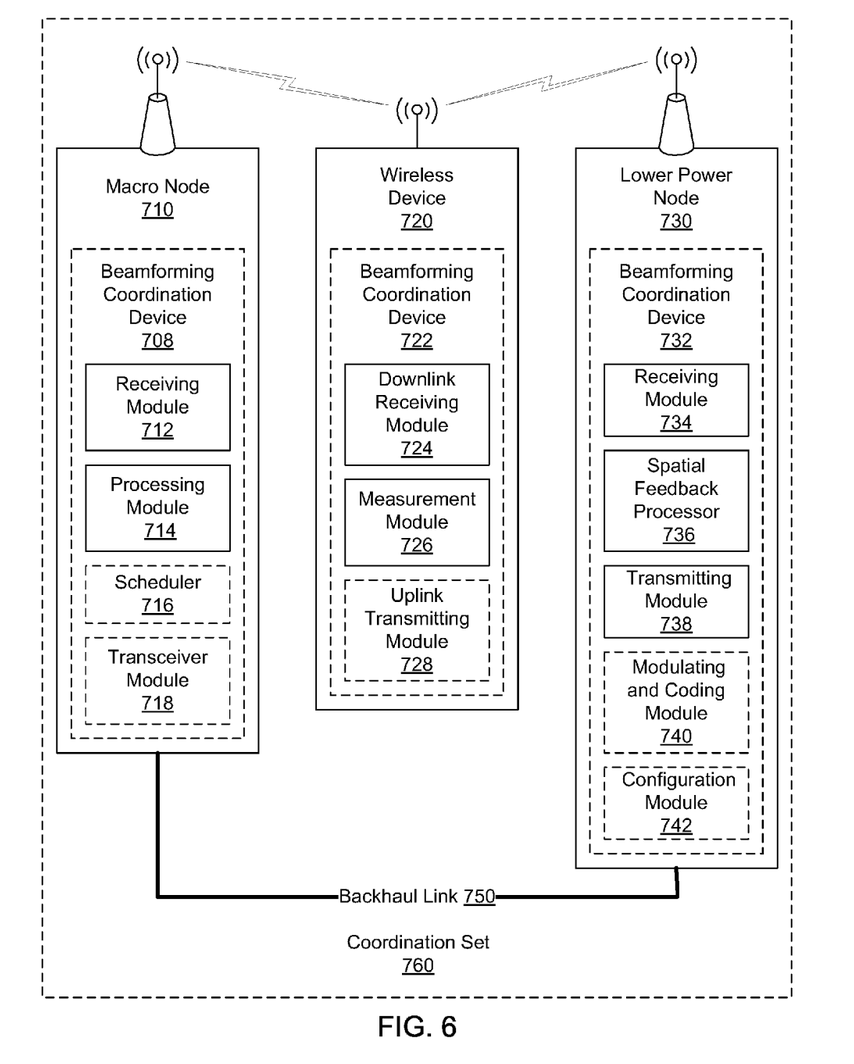
FIG. 6 illustrates a block diagram of a macro node, a low power node (LPN), and a wireless device in accordance with an example.

FIG. 6 illustrates an example macro node 710, an example low power node (LPN) 730, and an example wireless device 720 in a heterogeneous network (HetNet). The macro node can include a macro-eNB or a macro Node B (macro-NB), and the LPN can include a micro-eNB, a pico-eNB, a femto-eNB, or a home eNB (HeNB). The macro node and LPN can be in a coordination set 760 of the HetNet. In an example, the coordination set can have a plurality of LPNs. The macro node can be configured to communicate with the LPN via a backhaul link 750. The LPN can be configured transmit the spatial feedback report to the macro node via the backhaul link, and the macro node can be configured to receive a plurality of spatial feedback reports from the LPNs via the backhaul link. The backhaul link can include X2 signaling or backhaul link signaling via a wired connection, a wireless connection, or an optical fiber connection.

The macro node 710 can include a beamforming coordination device 708. The beamforming coordination device for the macro node can include a receiving module 712, processing module 714, a scheduler 716, or a transceiver module 718. The receiving module can be configured to receive a plurality of spatial feedback reports. A spatial feedback report can be received from each low power node (LPN) in a coordination set of the HetNet. Each spatial feedback report can provide information about interference from the macro node at a reporting LPN. The spatial feedback report can include a most frequently reported category of precoding matrix indicator (PMI) by wireless devices served by a reporting LPN, a quantized dominant principle eigen-vector of the wireless devices served by the reporting LPN, a matrix G generated by the reporting LPN from the wireless devices served by the reporting LPN, and combinations of these reports. The quantized dominant principle eigen-vector can correspond to a matrix $$G = \frac{1}{N_{UE}} \sum_{i=1}^{N_{UE}} SINR_i \cdot (v^{(eNB_0 \to UE_i)} \cdot v^{(eNB_0 \to UE_i)}{}_H),$$

where $SINR_i$ is a signal to interference and noise ratio (SINR) on a wireless device $UE_i$ corresponding to a macro node link without interference from the LPN, i is a positive integer representing each of the plurality of wireless devices in the LPN cell, and $N_{UE}$ is a positive integer of spatial feedback information reports from the plurality of wireless devices in the LPN cell, $v^{(eNB_0 \to UE_i)}$ is a quantized principle eigen-vector for a specified time slot representing the interference from the macro node on each wireless device $UE_i$, and $(\ )^H$ is a Hermitian function or conjugate transpose.

The processing module 714 can be configured to calculate a beamforming vector for a time-frequency resource partition using at least one spatial feedback report from the LPNs associated with a time-frequency resource partition. The time-frequency resource partition can provide a time-frequency resource for transmission coordination between the macro node and LPNs associated with the time-frequency resource partition. The beamforming vector can be configured to suppress interference in the spatial direction of the LPNs associated with the time-frequency resource partition. The processing module can be further configured to calculate the beamforming vector using a zero-forcing process for interference mitigation. The scheduler 716 can be configured to group LPNs with similar spatial characteristics into a same time-frequency resource partition as determined by the spatial feedback reports of the LPNs. The transceiver module 718 can be configured to transmit a channel using the beamforming vector during the time-frequency resource partition.

The LPN 730 can include a beamforming coordination device 732. The beamforming coordination device for the LPN can include a receiving module 734, a spatial feedback processor 736, a transmitting module 738, a modulating and coding module 740, and a configuration module 742. The receiving module of the LPN can be configured to collect spatial feedback information of macro node interference from a plurality of wireless devices in a LPN cell. The spatial feedback processor can be configured to compile the spatial feedback information at the LPN into a spatial feedback report. In an example, the spatial feedback information can include a precoding matrix indicator (PMI) or PMI index. The spatial feedback processor can be configured to categorize the spatial feedback information of the plurality of wireless devices, and select a most frequently reported category of the PMIs for the spatial feedback report. In another example, the spatial feedback processor can be configured to quantize a dominant principle eigen-vector corresponding to a matrix $$G = \frac{1}{N_{UE}} \sum_{i=1}^{N_{UE}} SINR_i \cdot (v^{(eNB_0 \rightarrow UE_i)} \cdot v^{(eNB_0 \rightarrow UE_i)}{}_H),$$

where $SINR_i$ is a signal to interference and noise ratio (SINR) on a wireless device $UE_i$ corresponding to a macro node link without interference from the LPN, i is a positive integer representing each of the plurality of wireless devices in the LPN cell, and $N_{UE}$ is a positive integer of spatial feedback information reports from the plurality of wireless devices in the LPN cell, $v^{(eNB_0 \rightarrow UE_i)}$ is a quantized principle eigen-vector or precoding matrix indicator (PMI) of a codebook representing spatial interference information from the macro node on each wireless device $UE_i$, and $(\ )^H$ is a Hermitian function or conjugate transpose. In an embodiment, the spatial feedback report can include the dominant quantized principle eigen-vector corresponding to the matrix G. In another example, the spatial feedback report can include the quantized matrix G.

The transmitting module 738 can be configured to send the spatial feedback report from the LPN to a macro node for calculating a beamforming vector to reduce the macro node interference for the plurality of wireless devices in the LPN cell. In an example, the transmitting module can be further configured to transmit a coordinated signal to a wireless device in a coordinated time-frequency resource partition, and transmit a non-coordinated signal to the wireless device a non-coordinated time-frequency resource partition. The coordinated signal can have reduced interference from a macro node transmission in the spatial direction of the wireless device using beamforming during the coordinated time-frequency resource partition. The non-coordinated signal can include interference from a macro node transmission during the non-coordinated time-frequency resource partition. The receiving module 734 of the LPN can be further configured to receive from the wireless device a coordinated channel quality indicator (CQI) feedback, and receive from the wireless device a non-coordinated CQI feedback. The coordinated CQI feedback can include an estimation of a propagation channel and interference during the coordinated time-frequency resource partition at the wireless device. The non-coordinated CQI feedback can include an estimation of a propagation channel and interference including a macro node interference channel during non-coordinated time-frequency resource partition at the wireless device. The modulating and coding module can be configured to modulate and code the coordinated signal using a coordinated modulation and coding scheme (MCS) based on the coordinated CQI feedback, and modulate and code the non-coordinated signal using a non-coordinated MCS based on the non-coordinated CQI feedback. The coordinated MCS can differ from the non-coordinated MCS.

The configuration module can be configured to semi-statically configure coordinated time-frequency resource partitions and non-coordinated time-frequency resource partitions via upper layer signaling with the macro node. A coordinated signal transmitted to a wireless device can have reduced interference from a macro node transmission in the spatial direction of the wireless device using beamforming during the coordinated time-frequency resource partition. A non-coordinated signal to the wireless device includes interference from a macro node transmission during the non-coordinated time-frequency resource partition.

The wireless device 720 (e.g., UE) can include a beamforming coordination device 722. The beamforming coordination device can include a downlink receiving module 724, a measurement module 726, and an uplink transmitting module 728. The downlink receiving module can be configured to receive a coordinated signal from a low power node (LPN) in a coordinated time-frequency resource partition, and receive a non-coordinated signal from the LPN in a non-coordinated time-frequency resource partition. The coordinated signal can have reduced interference from a macro node transmission in the spatial direction of the wireless device using beamforming during the coordinated time-frequency resource partition. The non-coordinated signal can include interference from a macro node transmission during the non-coordinated time-frequency resource partition.

The measurement module 726 can be configured to calculate a coordinated channel quality indicator (CQI) from an estimation of a propagation channel and interference during the coordinated time-frequency resource partition, and calculate a non-coordinated CQI from an estimation of a propagation channel and interference including a macro node interference channel during the non-coordinated time-frequency resource partition. The uplink transmitting module 728 can be configured to transmit the coordinated CQI from the wireless device to the LPN to enable transmission with coordinated modulation and coding scheme (MCS) for the coordinated signal, and transmit the non-coordinated CQI from the wireless device to the LPN to enable transmission with non-coordinated MCS for the non-coordinated signal to be determined the LPN. The uplink transmitting module can be further configured to transmit spatial feedback information of macro node interference channel from the wireless device to the LPN. The spatial feedback information can include a quantized principle eigen-vector, a preceding matrix indicator (PMI) of a code book, a signal path gain, a reference signal received power (RSRP), a signal to interference and noise ratio (SINR), or combinations this information.

Figure 7:
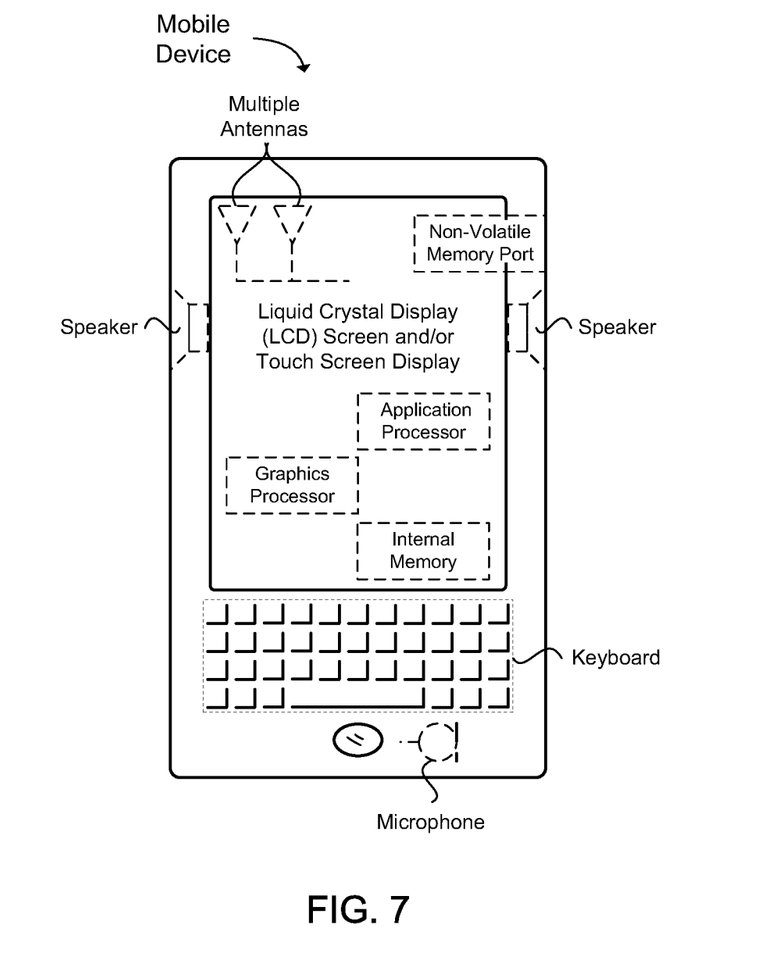
FIG. 7 illustrates a diagram of a wireless device in accordance with an example.

FIG. 7 provides an example illustration of the wireless device, such as a user equipment (UE), a mobile station (MS), a mobile wireless device, a mobile communication device, a tablet, a handset, or other type of mobile wireless device. The wireless device can include one or more antennas configured to communicate with a node, macro node, low power node (LPN), a transmission station, such as a base station (BS), an evolved Node B (eNB), a base band unit (BBU), a remote radio head (RRH), a remote radio equipment (RRE), a relay station (RS), a radio equipment (RE), or other type of wireless wide area network (WWAN) access point. The wireless device can be configured to communicate using at least one wireless communication standard including 3GPP LTE, WiMAX, High Speed Packet Access (HSPA), Bluetooth, and WiFi. The wireless device can communicate using separate antennas for each wireless communication standard or shared antennas for multiple wireless communication standards. The wireless device can communicate in a wireless local area network (WLAN), a wireless personal area network (WPAN), and/or a WWAN.

FIG. 7 also provides an illustration of a microphone and one or more speakers that can be used for audio input and output from the wireless device. The display screen may be a liquid crystal display (LCD) screen, or other type of display screen such as an organic light emitting diode (OLED) display. The display screen can be configured as a touch screen. The touch screen may use capacitive, resistive, or another type of touch screen technology. An application processor and a graphics processor can be coupled to internal memory to provide processing and display capabilities. A non-volatile memory port can also be used to provide data input/output options to a user. The non-volatile memory port may also be used to expand the memory capabilities of the wireless device. A keyboard may be integrated with the wireless device or wirelessly connected to the wireless device to provide additional user input. A virtual keyboard may also be provided using the touch screen.

Various techniques, or certain aspects or portions thereof, may take the form of program code (i.e., instructions) embodied in tangible media, such as floppy diskettes, CD-ROMs, hard drives, non-transitory computer readable storage medium, or any other machine-readable storage medium wherein, when the program code is loaded into and executed by a machine, such as a computer, the machine becomes an apparatus for practicing the various techniques. In the case of program code execution on programmable computers, the computing device may include a processor, a storage medium readable by the processor (including volatile and non-volatile memory and/or storage elements), at least one input device, and at least one output device. The volatile and non-volatile memory and/or storage elements may be a RAM, EPROM, flash drive, optical drive, magnetic hard drive, or other medium for storing electronic data. The base station and wireless device may also include a transceiver module, a counter module, a processing module, and/or a clock module or timer module. One or more programs that may implement or utilize the various techniques described herein may use an application programming interface (API), reusable controls, and the like. Such programs may be implemented in a high level procedural or object oriented programming language to communicate with a computer system. However, the program(s) may be implemented in assembly or machine language, if desired. In any case, the language may be a compiled or interpreted language, and combined with hardware implementations.

It should be understood that many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions, which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. The modules may be passive or active, including agents operable to perform desired functions.

Reference throughout this specification to "an example" means that a particular feature, structure, or characteristic described in connection with the example is included in at least one embodiment of the present invention. Thus, appearances of the phrases "in an example" in various places throughout this specification are not necessarily all referring to the same embodiment.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present invention may be referred to herein along with alternatives for the various components thereof. It is understood that such embodiments, examples, and alternatives are not to be construed as defacto equivalents of one another, but are to be considered as separate and autonomous representations of the present invention.

Furthermore, the described features, structures, or characteristics may be combined in any suitable manner in one or more embodiments. In the following description, numerous specific details are provided, such as examples of layouts, distances, network examples, etc., to provide a thorough understanding of embodiments of the invention. One skilled in the relevant art will recognize, however, that the invention can be practiced without one or more of the specific details, or with other methods, components, layouts, etc. In other instances, well-known structures, materials, or operations are not shown or described in detail to avoid obscuring aspects of the invention.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

What is claimed is:

1. At least one non-transitory machine readable storage medium comprising a plurality of instructions adapted to be executed to implement the method for spatial domain beamforming coordination at a low power node (LPN) in a heterogeneous network (HetNet), comprising:
   collecting at the LPN spatial feedback information of macro node interference from a plurality of wireless devices in a LPN cell;
   compiling the spatial feedback information at the LPN into a spatial feedback report; and
   sending the spatial feedback report from the LPN to a macro node for calculating a beamforming vector to reduce the macro node interference for the plurality of wireless devices in the LPN cell.

2. The non-transitory machine readable storage medium of claim 1, wherein the spatial feedback information is selected from the group consisting of a quantized principle eigenvector, a precoding matrix indicator (PMI) of a codebook, a signal path gain, a reference signal received power (RSRP), a signal to interference and noise ratio (SINR), and combinations thereof.

3. The non-transitory machine readable storage medium of claim 1, wherein compiling the spatial feedback information further comprises:
categorizing the spatial feedback information of the plurality of wireless devices, wherein the spatial feedback information includes a precoding matrix indicator (PMI); and
selecting a most frequently reported category of the PMIs for the spatial feedback report.

4. The non-transitory machine readable storage medium of claim 1, wherein compiling the spatial feedback information further comprises:
quantizing a dominant principle eigen-vector corresponding to a matrix $$G = \frac{1}{N_{UE}} \sum_{i=1}^{N_{UE}} SINR_i \cdot (v^{(eNB_0 \to UE_i)} \cdot v^{(eNB_0 \to UE_i)H}),$$

where $SINR_i$ is a signal to interference and noise ratio (SINR) on a wireless device $UE_i$ corresponding to a macro node link without interference from the LPN, i is a positive integer representing each of the plurality of wireless devices in the LPN cell, and NUE is a positive integer of spatial feedback information reports from the plurality of wireless devices in the LPN cell, $v^{(eNB_0 \to UE_i)}$ is a quantized principle eigen-vector or precoding matrix indicator (PMI) of a codebook representing spatial interference information from the macro node on each wireless device $UE_i$, and $(\ )^H$ is a Hermitian function,
wherein the spatial feedback report includes the dominant quantized principle eigen-vector corresponding to the matrix G.

5. The non-transitory machine readable storage medium of claim 1, wherein sending the spatial feedback report further comprises:
calculating a matrix $$G = \frac{1}{N_{UE}} \sum_{i=1}^{N_{UE}} SINR_i \cdot (v^{(eNB_0 \to UE_i)} \cdot v^{(eNB_0 \to UE_i)H}),$$

where $SINR_i$ is a signal to interference and noise ratio (SINR) on a wireless device $UE_i$ corresponding to a macro node link without interference from the LPN, i is a positive integer representing each of the plurality of wireless devices in the LPN cell, and $N_{UE}$ is a positive integer of spatial feedback information reports from the plurality of wireless devices in the LPN cell, $v^{(eNB_0 \to UE_i)}$ is a quantized principle eigen-vector or precoding matrix indicator (PMI) representing spatial interference information of a codebook from the macro node on each wireless device $UE_i$, and $(\ )^H$ is a Hermitian function,
wherein the spatial feedback report includes the quantized matrix G.

6. The non-transitory machine readable storage medium of claim 1, wherein the plurality of wireless devices include a majority of the wireless devices connected to the LPN.

7. The non-transitory machine readable storage medium of claim 1, further comprising:
transmitting a coordinated signal to a wireless device from a low power node (LPN) in a coordinated time-frequency resource partition, wherein the coordinated signal has reduced interference from a macro node transmission in the spatial direction of the wireless device using beamforming during the coordinated time-frequency resource partition;
receiving from the wireless device at the LPN a coordinated channel quality indicator (CQI) feedback, wherein the coordinated CQI feedback includes an estimation of a propagation channel and interference during the coordinated time-frequency resource partition at the wireless device;
modulating and coding the coordinated signal using a coordinated modulation and coding scheme (MCS) based on the coordinated CQI feedback;
transmitting a non-coordinated signal to the wireless device from the LPN in a non-coordinated time-frequency resource partition, wherein the non-coordinated signal includes interference from a macro node transmission during the non-coordinated time-frequency resource partition;
receiving from the wireless device at the LPN a non-coordinated CQI feedback, wherein the non-coordinated CQI feedback includes an estimation of a propagation channel and interference including a macro node interference channel during non-coordinated time-frequency resource partition at the wireless device; and
modulating and coding the non-coordinated signal using a non-coordinated MCS based on the non-coordinated CQI feedback, wherein the coordinated MCS differs from the non-coordinated MCS.

8. The non-transitory machine readable storage medium of claim 7, wherein the coordinated time-frequency resource partitions and the non-coordinated time-frequency resource partitions are selected from the group consisting of a radio frame, a radio subframe, a slot, a frequency carrier, a frequency subcarrier, a physical resource block (PRB), a subband, and combinations thereof.

9. The non-transitory machine readable storage medium of claim 1, further comprising:
semi-statically configuring, at the LPN, coordinated time-frequency resource partitions and non-coordinated time-frequency resource partitions via upper layer signaling with the macro node, wherein a coordinated signal transmitted to a wireless device has reduced interference from a macro node transmission in the spatial direction of the wireless device using beamforming during the coordinated time-frequency resource partition, and a non-coordinated signal to the wireless device includes interference from a macro node transmission during the non-coordinated time-frequency resource partition.

10. At least one non-transitory machine readable storage medium comprising a plurality of instructions adapted to be executed to implement the method for spatial domain beamforming coordination at a macro node in a heterogeneous network (HetNet), comprising:
receiving at the macro node a plurality of spatial feedback reports, wherein a spatial feedback report is received from each low power node (LPN) in a coordination set of the HetNet, and each spatial feedback report provides information about interference from the macro node at a reporting LPN; and
calculating a beamforming vector for the time-frequency resource partition using at least one spatial feedback report from the LPNs associated with the time-frequency resource partition, wherein the time-frequency resource partition provides a time-frequency resource for transmission coordination between the macro node and LPNs associated with the time-frequency resource partition, and the beamforming vector is configured to suppress interference in the spatial direction of the LPNs associated with a time-frequency resource partition.

11. The non-transitory machine readable storage medium of claim 10, further comprising:
grouping of LPNs with similar spatial characteristics into a same time-frequency resource partition as determined by the spatial feedback reports of the LPNs.

12. The non-transitory machine readable storage medium of claim 10, wherein the spatial feedback report is selected from the group consisting of a most frequently reported category of precoding matrix indicator (PMI) of codebook by wireless devices served by a reporting LPN, a quantized dominant principle eigen-vector of the wireless devices served by the reporting LPN, a matrix G generated by the reporting LPN from the wireless devices served by the reporting LPN, and combinations thereof, wherein the quantized dominant principle eigen-vector corresponds to a matrix $$G = \frac{1}{N_{UE}} \sum_{i=1}^{N_{UE}} SINR_i \cdot (v^{(eNB_0 \to UE_i)} \cdot v^{(eNB_0 \to UE_i)H}),$$

where $SINR_i$ is a signal to interference and noise ratio (SINR) on a wireless device $UE_i$ corresponding to a macro node link without interference from the LPN, i is a positive integer representing each of the plurality of wireless devices in the LPN cell, and $NU_E$ is a positive integer of spatial feedback information reports from the plurality of wireless devices in the LPN cell, $v^{(eNB_0 \to UE_i)}$ is a quantized principle eigen-vector for a specified time slot representing the interference from the macro node on each wireless device $UE_i$, and $(\ )^H$ is a Hermitian function.

13. The non-transitory machine readable storage medium of claim 10, further comprising:
transmitting a channel from the macro node using the beamforming vector during the time-frequency resource partition.

14. The non-transitory machine readable storage medium of claim 10, wherein calculating the beamforming vector further comprises using a zero-forcing process for interference mitigation.

15. The non-transitory machine readable storage medium of claim 10, further comprising:
semi-statically configuring at the macro node coordinated time-frequency resource partitions and non-coordinated time-frequency resource partitions via upper layer signaling with each LPN, wherein a coordinated signal transmitted to a wireless device in a specified LPN cell has reduced interference from a macro node transmission in the spatial direction of the wireless device using beamforming during the coordinated time-frequency resource partition, and a non-coordinated signal to the wireless device in the specified LPN cell includes interference from a macro node transmission during the non-coordinated time-frequency resource partition.

16. The non-transitory machine readable storage medium of claim 15, wherein the coordinated time-frequency resource partitions and the non-coordinated time-frequency resource partitions are selected from the group consisting of a radio frame, a radio subframe, a slot, a frequency carrier, a frequency subcarrier, a physical resource block (PRB), a sub-band, and combinations thereof.

17. The non-transitory machine readable storage medium of claims 10, wherein receiving at the macro node the plurality of spatial feedback reports includes X2 signaling or backhaul link signaling with the LPNs via a wired connection, a wireless connection, or an optical fiber connection.

18. At least one non-transitory machine readable storage medium comprising a plurality of instructions adapted to be executed to implement the method for spatial domain beamforming coordination at a wireless device in a heterogeneous network (HetNet), comprising:
receiving at the wireless device a coordinated signal from a low power node (LPN) in a coordinated time-frequency resource partition, wherein the coordinated signal has reduced interference from a macro node transmission in the spatial direction of the wireless device using beamforming during the coordinated time-frequency resource partition;
calculating a coordinated channel quality indicator (CQI) from an estimation of a propagation channel and interference during the coordinated time-frequency resource partition;
receiving at the wireless device a non-coordinated signal from the LPN in a non-coordinated time-frequency resource partition, wherein the non-coordinated signal includes interference from a macro node transmission during the non-coordinated time-frequency resource partition; and
calculating a non-coordinated CQI from an estimation of a propagation channel and interference including a macro node interference channel during the non-coordinated time-frequency resource partition.

19. The non-transitory machine readable storage medium of claim 18, further comprising:
transmitting the coordinated CQI from the wireless device to the LPN to enable transmission with coordinated modulation and coding scheme (MCS) for the coordinated signal; and
transmitting the non-coordinated CQI from the wireless device to the LPN to enable transmission with non-coordinated MCS for the non-coordinated signal to be determined the LPN.

20. The non-transitory machine readable storage medium of claim 18, further comprising:
transmitting spatial feedback information of macro node interference channel from the wireless device to the LPN, wherein the spatial feedback information is selected from the group consisting of a quantized principle eigen-vector, a preceding matrix indicator (PMI) of a code book, a signal path gain, a reference signal received power (RSRP), a signal to interference and noise ratio (SINR), and combinations thereof.

21. The non-transitory machine readable storage medium of claim 18, wherein the coordinated time-frequency resource partitions and the non-coordinated time-frequency resource partitions are selected from the group consisting of a radio frame, a radio subframe, a slot, a frequency carrier, a frequency subcarrier, a physical resource block (PRB), a sub-band, and combinations thereof.

22. The non-transitory machine readable storage medium of claim 18, wherein the wireless device is selected from the group consisting of a user equipment (UE) and a mobile station (MS), wherein the wireless device is configured to connect to at least one of a wireless local area network (WLAN), a wireless personal area network (WPAN), and a wireless wide area network (WWAN), wherein the wireless device includes an antenna, a touch sensitive display screen, a speaker, a microphone, a graphics processor, an application processor, internal memory, a non-volatile memory port, or combinations thereof.

23. A beamforming coordination device for a macro node in a heterogeneous network (HetNet) for spatial domain beamforming coordination, comprising:
- a receiving module configured to receive a plurality of spatial feedback reports, wherein a spatial feedback report is received from each low power node (LPN) in a coordination set of the HetNet, and each spatial feedback report provides information about interference from the macro node at a reporting LPN; and
- a processing module configured to calculate a beamforming vector for a time-frequency resource partition using at least one spatial feedback report from the LPNs associated with a time-frequency resource partition, wherein the time-frequency resource partition provides a time-frequency resource for transmission coordination between the macro node and LPNs associated with the time-frequency resource partition, and the beamforming vector is configured to suppress interference in the spatial direction of the LPNs associated with the time-frequency resource partition.

24. The beamforming coordination device of claim 23, further comprising:
- a scheduler configured to group LPNs with similar spatial characteristics into a same time-frequency resource partition as determined by the spatial feedback reports of the LPNs.

25. The beamforming coordination device of claim 23, wherein the spatial feedback report is selected from the group consisting of a most frequently reported category of precoding matrix indicator (PMI) by wireless devices served by a reporting LPN, a quantized dominant principle eigen-vector of the wireless devices served by the reporting LPN, a matrix G generated by the reporting LPN from the wireless devices served by the reporting LPN, and combinations thereof, wherein the quantized dominant principle eigen-vector corresponds to a matrix $$G = \frac{1}{N_{UE}} \sum_{i=1}^{N_{UE}} SINR_i \cdot (v^{(eNB_0 \to UE_i)} \cdot v^{(eNB_0 \to UE_i)}{}_H),$$

where $SINR_i$ is a signal to interference and noise ratio (SINR) on a wireless device $UE_i$ corresponding to a macro node link without interference from the LPN, i is a positive integer representing each of the plurality of wireless devices in the LPN cell, and NUE is a positive integer of spatial feedback information reports from the plurality of wireless devices in the LPN cell, $v^{(eNB_0 \to UE_i)}$ is a quantized principle eigen-vector for a specified time slot representing the interference from the macro node on each wireless device $UE_i$, and $(\ )^H$ is a Hermitian function.

26. The beamforming coordination device of claim 23, further comprising:
- a transceiver module configured to transmit a channel using the beamforming vector during the time-frequency resource partition.

27. The beamforming coordination device of claim 23, wherein the macro node includes a macro evolved Node B (macro-eNB) or a macro Node B (macro-NB).

* * * * *